(12) United States Patent
Wei et al.

(10) Patent No.: US 8,687,880 B2
(45) Date of Patent: Apr. 1, 2014

(54) REAL TIME HEAD POSE ESTIMATION

(75) Inventors: Yichen Wei, Beijing (CN); Fang Wen, Beijing (CN); Jian Sun, Beijing (CN); Tommer Leyvand, Seattle, WA (US); Jinyu Li, Sammamish, WA (US); Casey Meekhof, Kirkland, WA (US); Tim Keosababian, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 191 days.

(21) Appl. No.: 13/425,188

(22) Filed: Mar. 20, 2012

(65) Prior Publication Data
US 2013/0251244 A1 Sep. 26, 2013

(51) Int. Cl.
*G06K 9/62* (2006.01)
(52) U.S. Cl.
USPC .......................................................... 382/159
(58) Field of Classification Search
USPC .......................................................... 382/159
See application file for complete search history.

(56) References Cited

U.S. PATENT DOCUMENTS

| | | | |
|---|---|---|---|
| 6,964,023 B2 | 11/2005 | Maes et al. | |
| 7,324,671 B2 * | 1/2008 | Li et al. | 382/118 |
| 7,336,296 B2 | 2/2008 | Brown et al. | |
| 7,508,979 B2 | 3/2009 | Comaniciu et al. | |
| 7,590,267 B2 * | 9/2009 | Xiao et al. | 382/118 |
| 2008/0187174 A1 | 8/2008 | Metaxas et al. | |
| 2009/0252423 A1 | 10/2009 | Zhu et al. | |
| 2011/0050568 A1 | 3/2011 | Hu et al. | |
| 2012/0288167 A1 * | 11/2012 | Sun et al. | 382/118 |

OTHER PUBLICATIONS (Chengbin Zeng, "Robust Head-Shoulder Detection by PCA-Based Multilevel HOG-LBP Detector for People Counting", 2010, IEEE Xplore Digital Library).*
Zhang, et al., "Local Gabor Binary Pattern Histogram Sequence (LGBPHS): A Novel Non-Statistical Model for Face Representation and Recognition", Retrieved at <<http://www.jdl.ac.cn/user/xlchen/Paper/ICCV05.pdf>>, Proceedings of the Tenth IEEE International Conference on Computer Vision (ICCV), Oct. 17-21, 2005, pp. 786-791.
Ma, et al., "Robust Head Pose Estimation Using LGBP", Retrieved at <<http://www.jdl.ac.cn/user/xlchen/Paper/ICPR06b.pdf>>, The 18th International Conference on Pattern Recognition (ICPR), Aug. 20-24, 2006, pp. 512-515.
Shan, et al., "Facial Expression Recognition based on Local Binary Patterns: A Comprehensive Study", Retrieved at <<http://citeseerx.ist.psu.edu/viewdoc/download?doi=10.1.1.160.2442&rep=rep1&type=pdf>>, Image and Vision Computing, Aug. 16, 2008, pp. 803-816.
Ahonen, et al., "Face Recognition with Local Binary Patterns", Retrieved at <<http://masters.donntu.edu.ua/2011/frt/dyrul/library/article8.pdf>>, 8th European Conference on Computer Vision, ser. Lecture Notes in Computer Science, vol. 3021, May 11-14, 2004, pp. 469-481.

* cited by examiner

*Primary Examiner* — Samir Ahmed
*Assistant Examiner* — Totam Le
(74) *Attorney, Agent, or Firm* — Aaron Chatterjee; Andrew Sanders; Micky Minhas

(57) ABSTRACT

Methods are provided for generating a low dimension pose space and using the pose space to estimate one or more head rotation angles of a user head. In one example, training image frames including a test subject head are captured under a plurality of conditions. For each frame an actual head rotation angle about a rotation axis is recorded. In each frame a face image is detected and converted to an LBP feature vector. Using principal component analysis a PCA feature vector is generated. Pose classes related to rotation angles about a rotation axis are defined. The PCA feature vectors are grouped into a pose class that corresponds to the actual rotation angle associated with the PCA feature vector. Linear discriminant analysis is applied to the pose classes to generate the low dimension pose space.

20 Claims, 10 Drawing Sheets

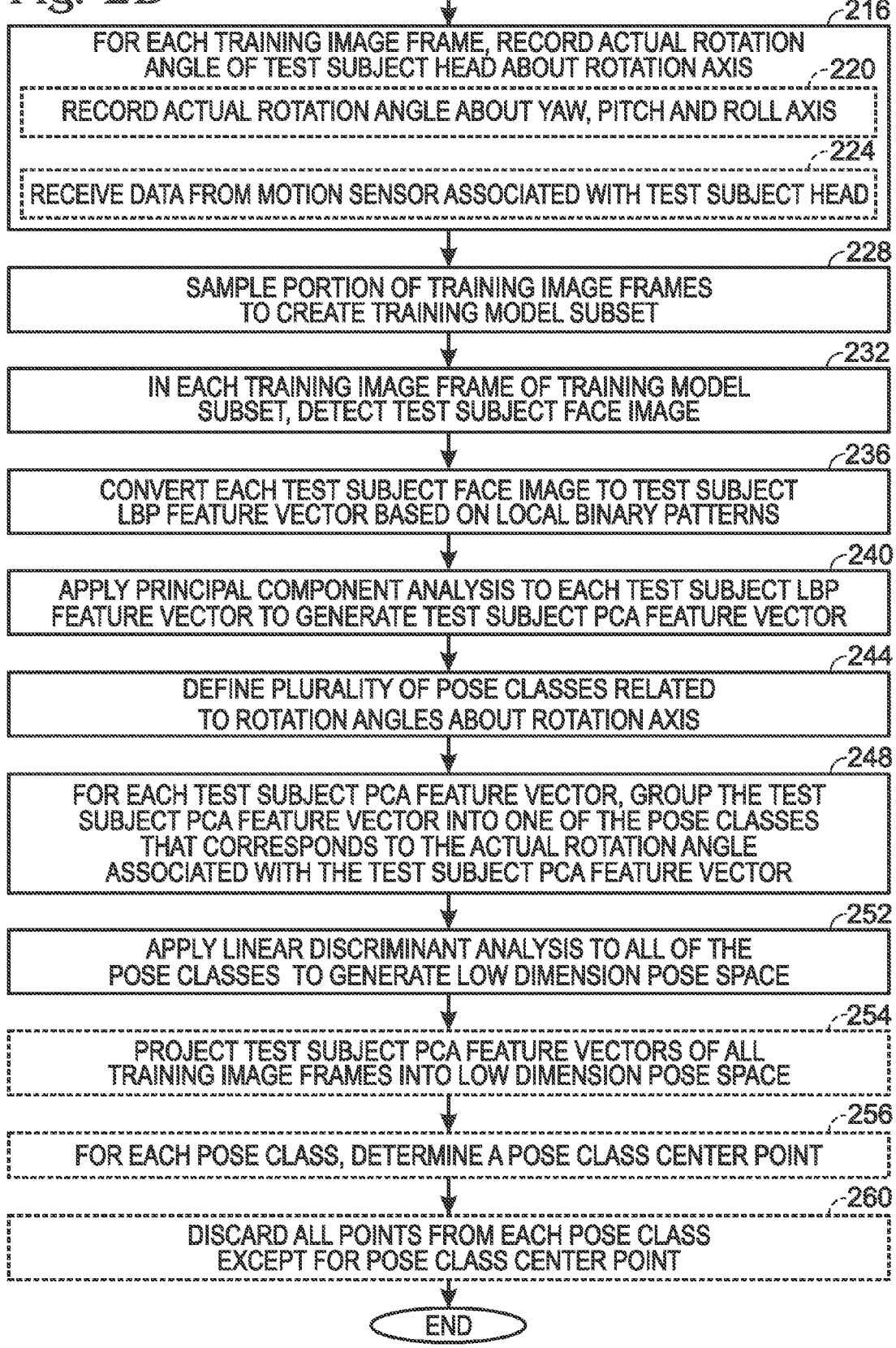

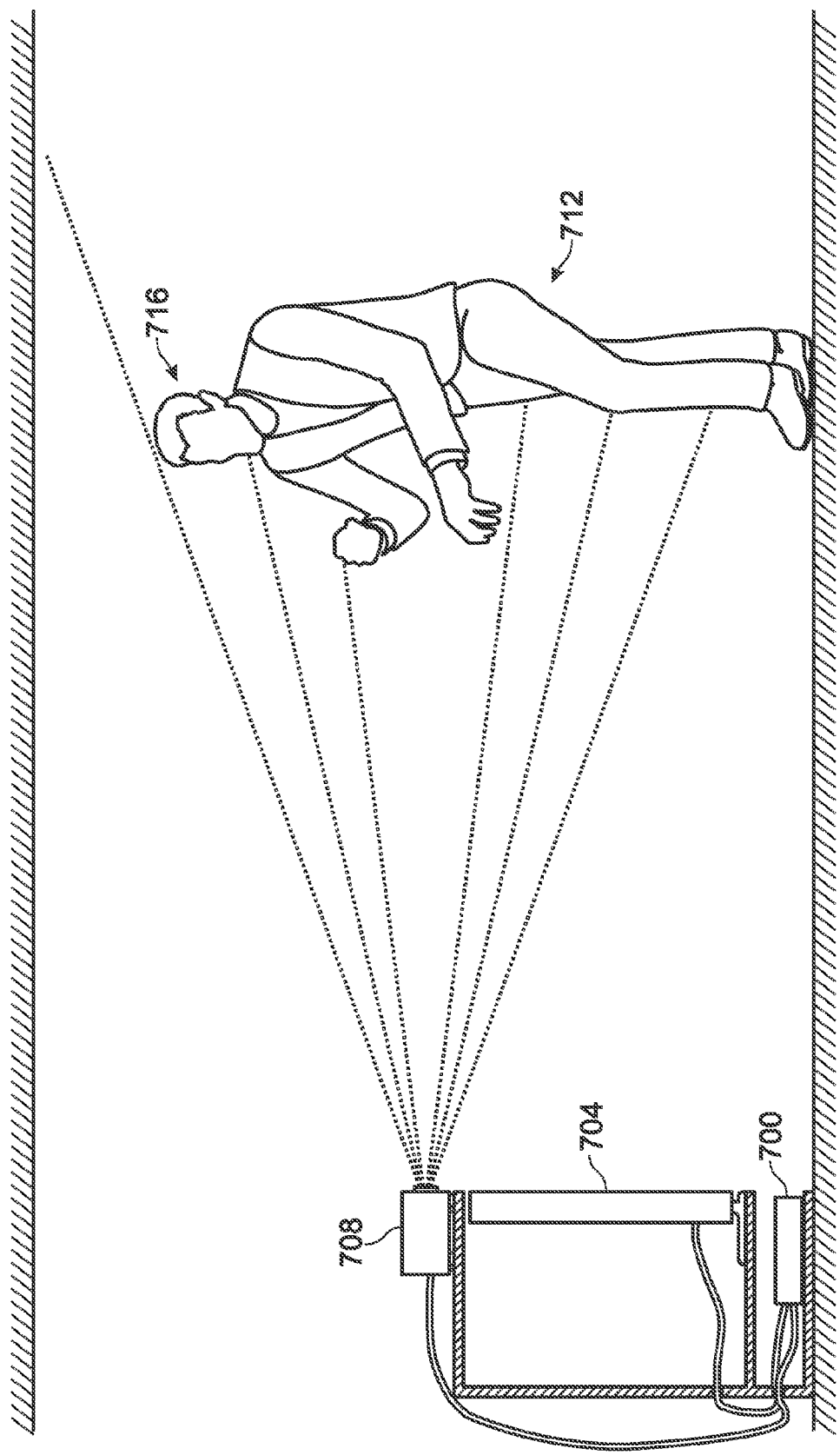

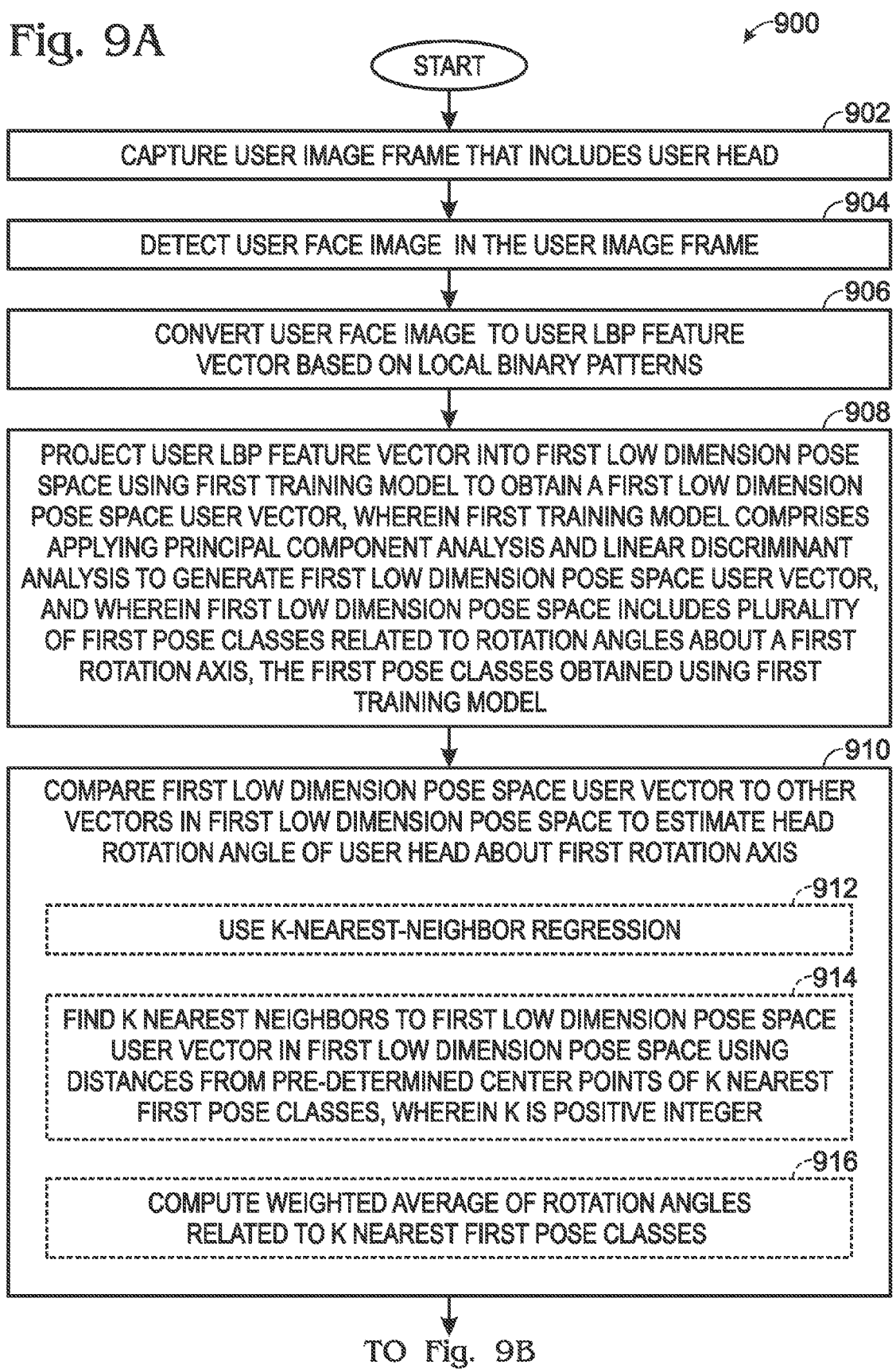

Fig. 9B    FROM Fig. 9A

918 — PROJECT USER LBP FEATURE VECTOR INTO SECOND LOW DIMENSION POSE SPACE THAT CORRESPONDS TO SECOND ROTATION AXIS USING SECOND TRAINING MODEL TO OBTAIN SECOND LOW DIMENSION POSE SPACE USER VECTOR, WHEREIN SECOND TRAINING MODEL COMPRISES APPLYING PRINCIPAL COMPONENT ANALYSIS AND LINEAR DISCRIMINANT ANALYSIS TO GENERATE SECOND LOW DIMENSION POSE SPACE USER VECTOR, AND WHEREIN SECOND LOW DIMENSION POSE SPACE INCLUDES PLURALITY OF SECOND POSE CLASSES RELATED TO ROTATION ANGLES ABOUT SECOND ROTATION AXIS, THE SECOND POSE CLASSES OBTAINED USING SECOND TRAINING MODEL

920 — COMPARE SECOND LOW DIMENSION POSE SPACE USER VECTOR TO OTHER VECTORS IN SECOND LOW DIMENSION POSE SPACE TO ESTIMATE HEAD ROTATION ANGLE OF USER HEAD ABOUT SECOND ROTATION AXIS

922 — PROJECT USER LBP FEATURE VECTOR INTO THIRD LOW DIMENSION POSE SPACE THAT CORRESPONDS TO THIRD ROTATION AXIS USING THIRD TRAINING MODEL TO OBTAIN THIRD LOW DIMENSION POSE SPACE USER VECTOR, WHEREIN THIRD TRAINING MODEL COMPRISES APPLYING PRINCIPAL COMPONENT ANALYSIS AND LINEAR DISCRIMINANT ANALYSIS TO GENERATE THIRD LOW DIMENSION POSE SPACE USER VECTOR, AND WHEREIN THIRD LOW DIMENSION POSE SPACE INCLUDES PLURALITY OF THIRD POSE CLASSES RELATED TO ROTATION ANGLES ABOUT THIRD ROTATION AXIS, THE THIRD POSE CLASSES OBTAINED USING THIRD TRAINING MODEL

924 — COMPARE THIRD LOW DIMENSION POSE SPACE USER VECTOR TO OTHER VECTORS IN THIRD LOW DIMENSION POSE SPACE TO ESTIMATE HEAD ROTATION ANGLE OF USER HEAD ABOUT THIRD ROTATION AXIS

926 — CAPTURE PLURALITY OF USER IMAGE FRAMES THAT EACH INCLUDES USER HEAD

928 — FOR EACH USER IMAGE FRAME, ESTIMATE HEAD ROTATION ANGLE OF USER HEAD ABOUT PITCH AND YAW ROTATION AXIS

TO Fig. 9C

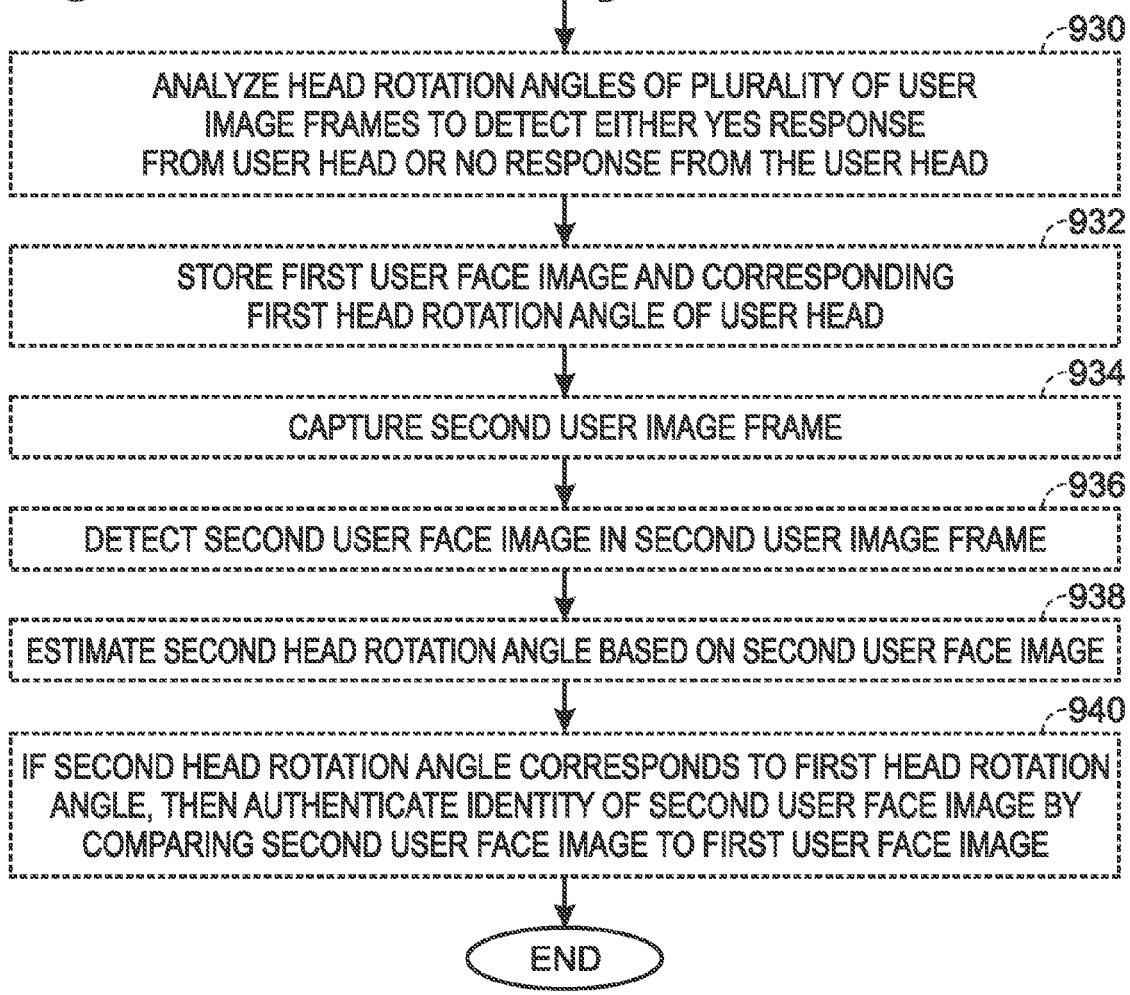
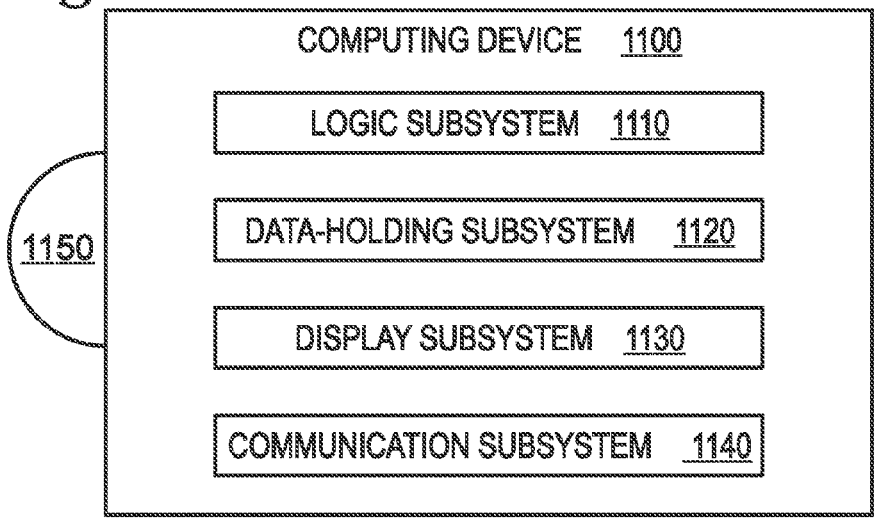

REAL TIME HEAD POSE ESTIMATION

BACKGROUND

Estimating one or more rotation angles, or "pose", of a person's head may yield information useful for various human-computer interactions. For example, head rotation angles may be useful as input in certain video games. In one prior approach, a classifier is trained to distinguish between a small number of discrete poses such as, for example, a frontal pose, a left profile and a right profile. This approach, however, produces pose estimations that are coarse and discrete, with output granularity limited to one of the pre-defined discrete poses. Additionally, by using a small number of discrete poses for its training data, the amount and variation of training data samples used by this approach are limited. This prior approach also has difficulty properly classifying poses taken under varying lighting conditions.

In another approach, certain facial points, such as eye corner, mouth corner and nose tip, are detected and used to estimate a head pose. One drawback with this approach is that it requires computing a significant amount of information that exceeds the relevant data needed for the estimation, and is therefore computationally demanding and expensive. Significant initialization of a particular user's facial points may also be required.

SUMMARY

To address the above issues, methods for generating a low dimension pose space and using the pose space to estimate one or more head rotation angles of a user head are provided. In one example, a method for generating a low dimension pose space may include capturing a plurality of training image frames that each includes a test subject head under a plurality of conditions. For each training image frame, the method may include recording an actual rotation angle of the test subject head about a rotation axis. The method may further include sampling a portion of the plurality of training image frames to create a training model subset of training image frames.

For each training image frame of the training model subset, the method may include detecting a test subject face image in the training image frame, converting the test subject face image to a test subject LBP feature vector based on local binary patterns, and applying principal component analysis to the test subject LBP feature vector to generate a test subject PCA feature vector. The method may further include defining a plurality of pose classes related to rotation angles about the rotation axis. For each of the test subject PCA feature vectors, the method may include grouping the test subject PCA feature vector into one of the plurality of pose classes that corresponds to the actual rotation angle associated with the test subject PCA feature vector. The method may then include applying linear discriminant analysis to each of the plurality of pose classes to generate the low dimension pose space.

In another example, a method for estimating a head rotation angle of a user head is provided. The method may include capturing a user image frame that includes the user head, detecting a user face image in the user image frame, and converting the user face image to a user LBP feature vector based on local binary patterns. The method may also include projecting the user LBP feature vector into a low dimension pose space using a training model to obtain a low dimension pose space user vector. The training model may comprise applying principal component analysis and linear discriminant analysis to generate the low dimension pose space user vector. The low dimension pose space may include a plurality of pose classes related to rotation angles about a rotation axis, with the pose classes obtained using the training model. The method may also include comparing the low dimension pose space user vector to other vectors in the low dimension pose space to estimate the head rotation angle of the user head about the rotation axis.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 2A and 2B are flow diagrams illustrating a method for generating a low dimension pose space according to one embodiment of the present disclosure.

FIG. 7 is a schematic view of a user interacting with a gaming system depth camera associated with the run-time computing device of FIG. 6.

FIGS. 9A, 9B, and 9C are flow diagrams illustrating a method for estimating a head rotation angle of a user head according to one embodiment of the present disclosure.

FIG. 11 is a simplified schematic illustration of an embodiment of a computing device.

DETAILED DESCRIPTION

Figure 1:
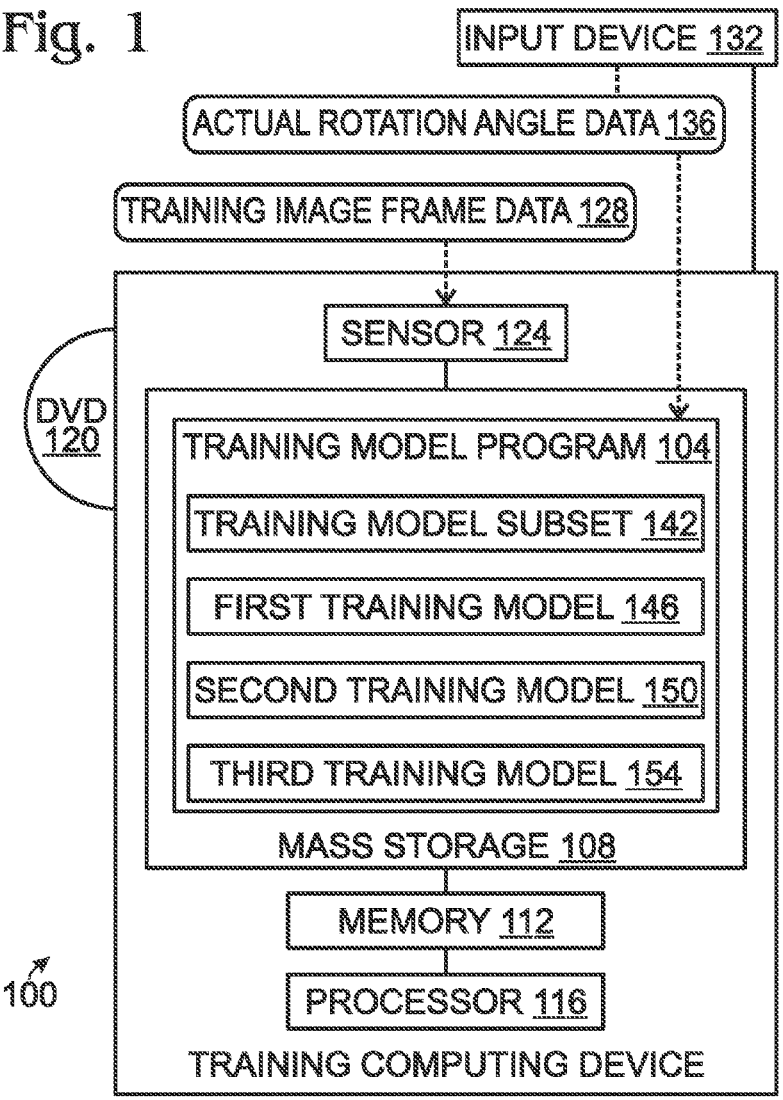
FIG. 1 is a schematic view of a training computing device according to an embodiment of the present disclosure.

FIG. 1 is a schematic illustration of a training computing device 100 according to an embodiment of the present disclosure. As explained in more detail below, the training computing device 100 may be used to generate one or more training models including a low dimension pose space that may be used by another computing device, such as run-time computing device 600 shown in FIG. 6, to estimate one or more head rotation angles. The training computing device 100 may generate the training models by capturing training image frames of a test subject along with actual rotation angles of the test subject's head.

The training computing device 100 may include a training model program 104 that may be stored in mass storage 108 of the training computing device. The training model program 104 may be loaded into memory 112 and executed by a processor 116 of the training computing device 100 to perform one or more of the methods and processes described in more detail below.

In some examples the training model program 104 may be received by the training computing device 100 from removable computer-readable storage media 120, shown here in the form of a DVD. The removable computer-readable storage media 120 may also take the form of CDs, HD-DVDs, Blu-Ray Discs, EEPROMs, and/or floppy disks, among others. In other examples, the training model program 104 may be received from a remote source via network.

Training computing device 100 may take the form of a desktop computer, laptop computer, tablet computing, mobile computer, networking computer, or any other type of suitable computing device. Additional details regarding the components and computing aspects of the training computing device 100 are described in more detail below with respect to FIG. 11.

Figure 2A:
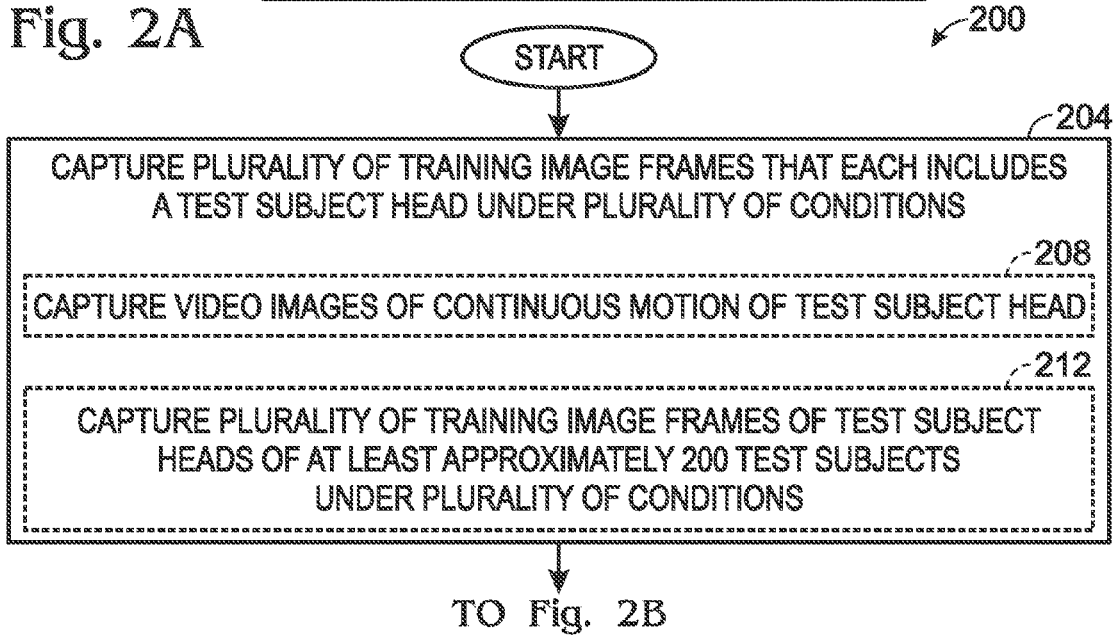
Figure 3:
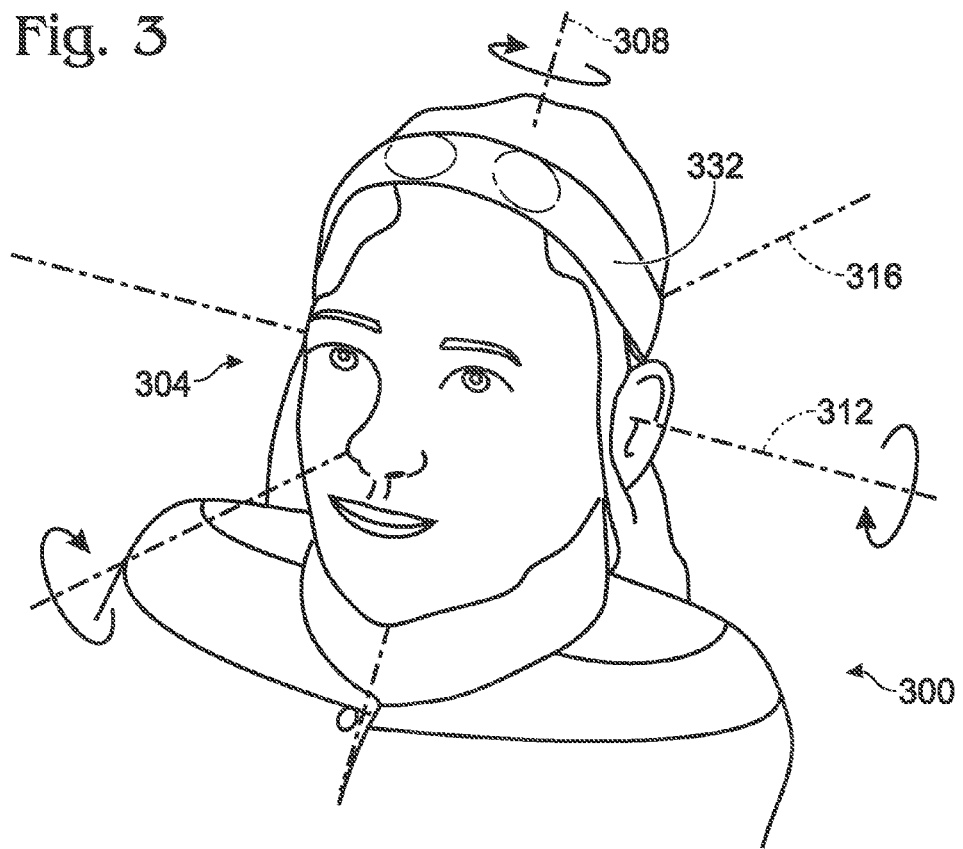
FIG. 3 is a schematic perspective view of a test subject showing yaw, pitch, and roll axes of rotation with respect to the test subject's head.

Turning now to FIGS. 2A and 2B, an embodiment of a method 200 for generating a low dimension pose space for estimating one or more head rotation angles of a test subject will now be described. The method 200 may be performed using the hardware and software components of the training computing device 100 described above and the motion sensor described below and shown in FIGS. 3 and 4, or using any other suitable components.

At 204 the method may include capturing a plurality of training image frames that each includes a test subject head under a plurality of conditions. With reference to FIG. 1, the training computing device 100 may include a sensor 124 for capturing training image frame data 128 from a test subject, such as test subject 300 having test subject head 304 illustrated in FIG. 3. The sensor 124 may be integrated into the training computing device 100 as shown in FIG. 1, or may be separate from the training computing device. The sensor 124 may comprise, for example, a video camera that records color image data such as RGB image data and/or monochrome image data such as IR image data. In other examples, the sensor 124 may comprise a depth camera that records depth image data related to distances of features of the test subject 300 from the depth camera. Examples of depth cameras include, but are not limited to, time-of-flight cameras, structured light cameras, and stereo camera systems. For purposes of this description, the sensor 124 will be described as a color video camera that captures RBG image data.

At 208, the method may include capturing training video images of continuous motion of the test subject head 304. For example, and with reference also to FIG. 3, the sensor 124 may capture training video images of the test subject head 304 moving about a yaw axis 308, a pitch axis 312 and a roll axis 316. In one example, the test subject 300 may first move her test subject head 304 generally solely about one of the three axes of rotation, such as the yaw axis 308, while the sensor 124 records training video images. The test subject 300 may then move her test subject head 304 generally solely about another of the axes of rotation, such as the pitch axis 312, and then generally solely about the roll axis while the sensor 124 records training video images.

As noted above, the sensor 124 may capture a plurality of training image frames under a plurality of conditions. In one example, the plurality of conditions may include one or more of a lighting condition, a distance from the sensor 124, and a test subject expression. In a more specific example, the lighting condition may include at least a bright lighting condition and a dark lighting condition that is darker than the bright lighting condition. The distance from the camera may include at least a near distance from the camera and a far distance from the camera that is larger than the near distance. And the test subject expression may include at least a neutral mouth expression, a mouth open expression, and a smiling expression.

In this example the various conditions are combined in 12 different combinations, and each movement of the test subject head 304 about one of the three axes of rotation is recorded under each of the 12 different combinations of conditions. More specifically, for the neutral mouth expression, training image frames are captured under a dark lighting and far distance condition, a dark lighting and near distance condition, a bright lighting and far distance condition, and a bright lighting and near distance condition. Similarly, for the mouth open expression, training image frames are captured under a dark lighting and far distance condition, a dark lighting and near distance condition, a bright lighting and far distance condition, and a bright lighting and near distance condition. For the smiling expression, training image frames are captured under a dark lighting and far distance condition, a dark lighting and near distance condition, a bright lighting and far distance condition, and a bright lighting and near distance condition. It will also be appreciated that training image frames may be captured under fewer, more and/or different conditions, and under different combinations of such conditions.

To gather an extensive sampling of test user data, the method 200 may include capturing training image frames of a plurality of test subjects under a plurality of conditions. For example, at 212 the method may include capturing a plurality of training image frames of test subject heads of at least approximately 200 test subjects under a plurality of conditions. Fewer or greater numbers of test subjects may also be used such as, for example, 50, 100, 150, 250 or more test subjects. As explained in more detail below, by gathering training image data from a number of different test subjects having different facial features and under a variety of conditions, the method 200 may generate robust training models that include low dimension pose space vectors which are discriminative with respect to head rotation angles.

At 216, the method 200 may include recording an actual rotation angle of the test subject head 304 about one of the axes of rotation 308, 312 and 316 for each training image frame. In one example, and with reference to 220, the method 200 may include recording actual rotation angles about the yaw 308, pitch 312, and roll 316 axes of rotation. At 224, the method may also include receiving data from a motion sensor associated with the test subject head 304.

With reference to FIG. 1, an input device 132 may detect one or more actual rotation angles of the test subject head 304 and transmit actual rotation angle data 136 to the training computing device 100. In one example, and with reference also to FIGS. 3 and 4, the input device 132 may comprise a head-wearable motion sensor 332 worn by the test subject 300. The head-wearable motion sensor 332 may include, for example, one or more accelerometers that detect rotation angles about the yaw axis of rotation 308, pitch axis of rotation 312, and roll axis of rotation 316. For each training image frame recorded by the sensor 124, metadata of the actual rotation angle of the test subject head 304 about the three axes of rotation is stored with the training image frame.

At 228 the method 200 may include sampling a portion of the training image frames to create a training model subset 142 of training image frames. In one example, approximately 5% of the total number of training image frames captured from 200 subjects under a variety of conditions are sampled to create the training model subset 142. It will be appreciated that other portions of total numbers of training image frames captured may be sampled including, but not limited to, 3%, 4%, 6%, 7% and other suitable portions.

Figure 4:
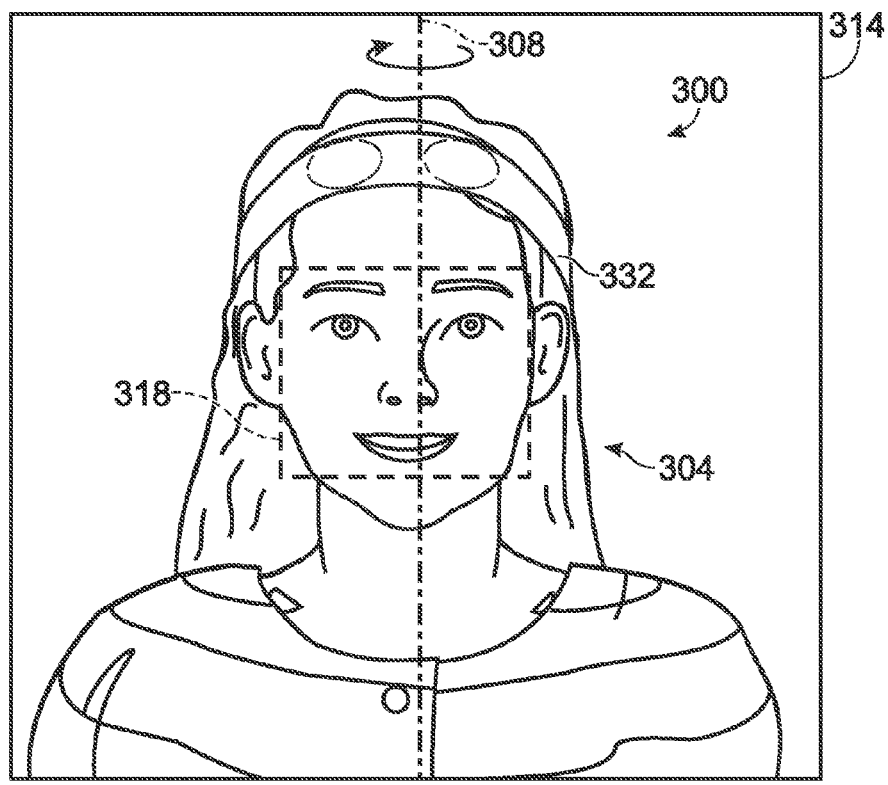
FIG. 4 is a schematic view of a training image frame of the test subject shown in FIG. 3 that includes a test subject face image.

Beginning at 232, and as described in more detail below, the method 200 may include several steps that are performed for each training image frame of the training model subset 142 to generate a test subject PCA feature vector corresponding to each training image frame. At 232, the method 200 may include detecting a test subject face image in the training image frame. With reference now to FIG. 4, a training image frame 314 includes the test subject head 304 of the test subject 300. In one example, the training model program 104 detects the test subject face image 318 in the training image frame 314. The test subject face image 318 may comprise, for example, an RGB image 40 pixels wide by 40 pixels high. To detect the face image of the test subject head 304, the training model program may use any suitable face detection technologies and/or algorithms including, but not limited to, local binary patterns (LBP), principal component analysis (PCA), independent component analysis (ICA), evolutionary pursuit (EP), Elastic Bunch Graph Matching (EBGM), or other suitable algorithm or combination of algorithms.

At 236, the method 200 may include converting the test subject face image 318 to a test subject local binary pattern (LBP) feature vector based on local binary patterns in the test subject face image. In one example, the area of the test subject face image 318 is divided into smaller sub-regions from which LBP histograms are extracted. The histograms are concatenated into a single, spatially enhanced feature histogram that represents the test subject face image 318.

The resulting LBP feature vector may be a high dimension vector containing an amount of data in excess of an amount of data needed for the method 200. In one example, the LBP feature vector may have a vector length of approximately 7000. Accordingly, the method 200 may include applying a dimension reduction technique to the LBP feature vector. More specifically, at 240 the method 200 may include applying principal component analysis (PCA) to the test subject LBP feature vector to generate a test subject PCA feature vector. In applying PCA to the high dimension test subject LBP feature vector, the data in the LBP feature vector is mapped to a lower dimension representation in a manner that maximizes the variance of the data. In one example, the PCA feature vector may have a vector length of approximately 2000-3000.

Beginning at 244, and as described in more detail below, the method 200 may include several steps that are applied to all of the test subject PCA feature vectors that correspond to the yaw axis of rotation 308 to generate a first training model 146 associated with the yaw axis of rotation. In similar manner, these steps may be separately applied to all of the test subject PCA feature vectors that correspond to the pitch axis of rotation 312 to generate a second training model 150 associated with the pitch axis of rotation. These steps may also be applied to all of the test subject PCA feature vectors that correspond to the roll axis of rotation 316 to generate a third training model 154 associated with the roll axis of rotation. In this manner, the method 200 may generate a low dimension pose space for each of the three axes of rotation. For purposes of description, the method 200 is described below with regard to test subject PCA feature vectors that correspond to the yaw axis of rotation 308.

At 244, the method 200 may include defining a plurality of pose classes related to rotation angles about the yaw axis of rotation 308. For purposes of this description, a pose class is defined as a collection of test subject face images or corresponding vectors that have an actual rotation angle that matches a pose class rotation angle or falls within a pose class rotation angle range. In one example, the plurality of pose classes may be related to steps of 10-degree rotation angle ranges about the yaw axis of rotation 308. In a more specific example, where zero degrees rotation about the yaw axis of rotation 308 corresponds to a face front position of the test subject head 304, the pose classes may include a −45 to −35 degree pose class, −34.9 to −25 degree pose class, −24.9 to −15 degree pose class, −14.9 to −5 degree pose class, −4.9 to 5 degree pose class, 5.1 to 15 degree pose class, 15.1 to 25 degree pose class, 25.1 to 35 degree pose class, and 35.1 to 45 degree pose class (9 pose classes). It will be appreciated that other steps of rotation angle ranges and corresponding total number of pose classes may also be used including, but not limited to, 4-degree, 7-degree, 13-degree, 16-degree, and any other suitable rotation angle range.

At 248 the method 200 may include, for each of the test subject PCA feature vectors, grouping the test subject PCA feature vector into one of the plurality of pose classes that corresponds to the actual rotation angle associated with the test subject PCA feature vector. It will also be appreciated that, while all of the test subject PCA feature vectors in a given pose class have a rotation angle within that pose class rotation angle range, the test subject PCA feature vectors will correspond to various different test subjects having different facial features and different test subject expressions, with the images taken from different distances from the sensor and under different lighting conditions. Accordingly, each pose class will contain a robust sampling of various test subject image representations that all correspond to the pose class rotation angle range.

At 252, the method 200 may include applying multi-class linear discriminant analysis (LDA) to all of the pose classes to generate a low dimension pose space for the first training model 146. In one example, the vector length of the low dimension pose space may be one less than the total number of pose classes. For example, if 20 pose classes are utilized, the vector length of the low dimension pose space may be 19. It will be appreciated that other suitable relationships between the number of pose classes and the vector length of the low dimension pose space may be used.

By applying LDA on pose-class-by-pose-class basis, additional dimension reduction is achieved for each test subject PCA feature vector in the pose classes. As described in more detail below, this enables the first training model 146 to provide more efficient head rotation angle estimation in a runtime environment. Further, the variations between different pose classes are maximized while the variations within individual pose classes are minimized. Alternatively expressed, the first training model 146 retains discriminative and informative information related to head rotation angle by virtue of the different pose classes being further separated in the low dimension pose space embodied in the training model. In this manner, the training model 146 further distinguishes between the pose classes while being less sensitive to variations related to other factors (such as different test subject facial features, expressions, lighting conditions, etc.).

Figure 5:
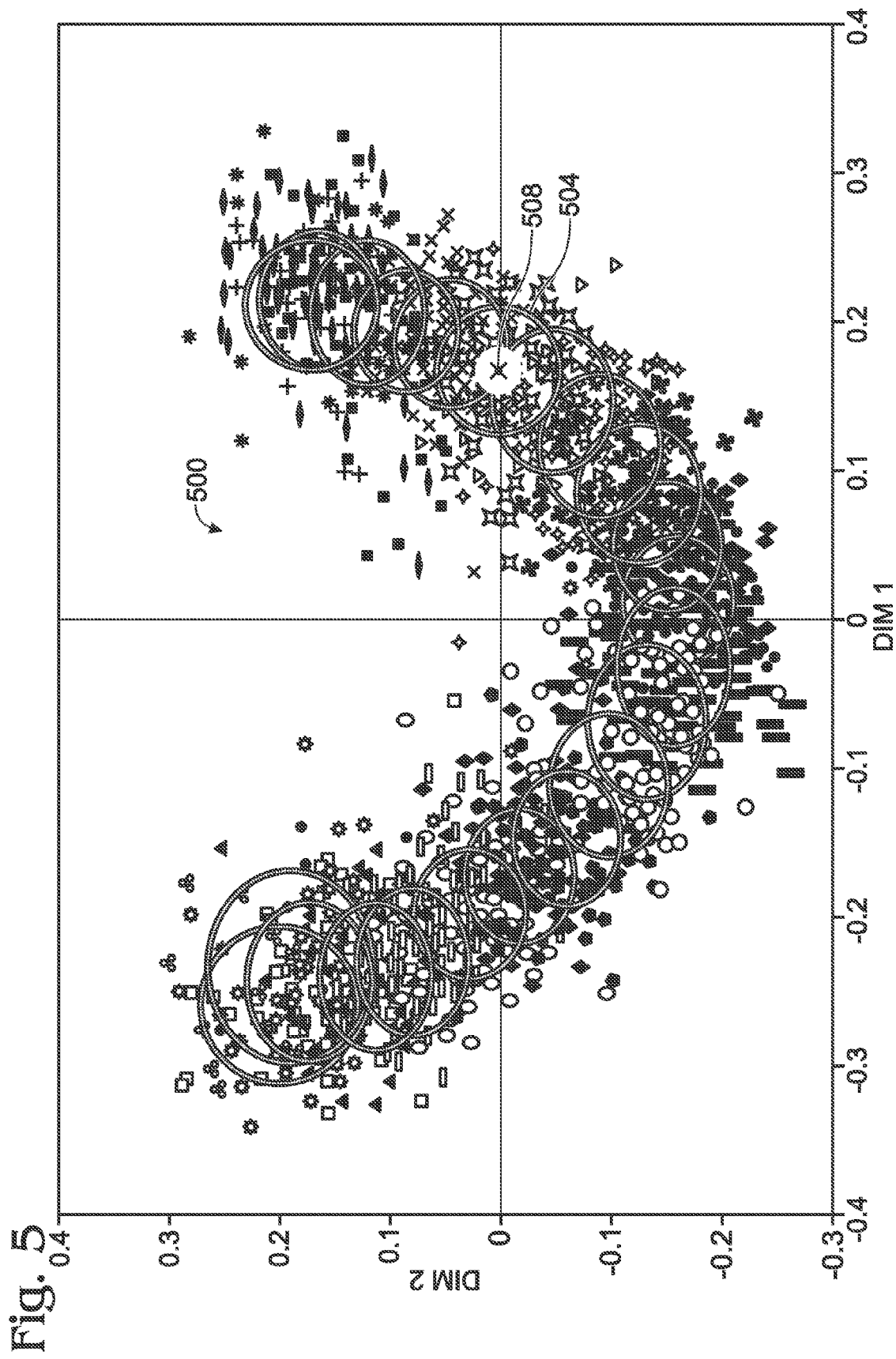
FIG. 5 is a schematic illustration of training image samples projected into the first two dimensions of a low dimension pose space.

At 254, the method 200 may include projecting the test subject PCA feature vectors of all of the training image frames into the low dimension pose space. At 256, the method may include determining a pose class center point for each pose class. Turning now to FIG. 5, a schematic representation 500 of one example of training image samples projected into the first two dimensions of a low dimension pose space corresponding to training model 146 is provided. In this example representation 500, members of 22 different pose classes are represented by 22 different symbols such as a black diamond, a black triangle, a plus sign, etc. For each pose class a circle is illustrated having a center at the pose class center, with the radius of the circle corresponding to the pose class standard variation. For example, circle 504 having a center 508 may correspond to a pose class containing vectors that have an actual rotation angle that falls within a pose class rotation angle range of 24-28 degrees. Members of this pose class are indicated by a square symbol having inwardly curving sides. It will be appreciated that the multiple pose classes illustrated in FIG. 5 are well separated and indicative of a discriminative subspace with respect to head rotation angle.

At 260 the method may include, for each of the pose classes, discarding all points from the pose class except for the pose class center point. By retaining only the pose class center points, the first training model 146 may provide more efficient computation of estimated head rotation angles, as described further below.

As noted above, the method 200 may be utilized independently for all three axes of rotation to generate a first training model 146 for the yaw axis of rotation 308, second training model 150 for the pitch axis of rotation 312, and third training model 154 for the roll axis of rotation 316.

Figure 6:
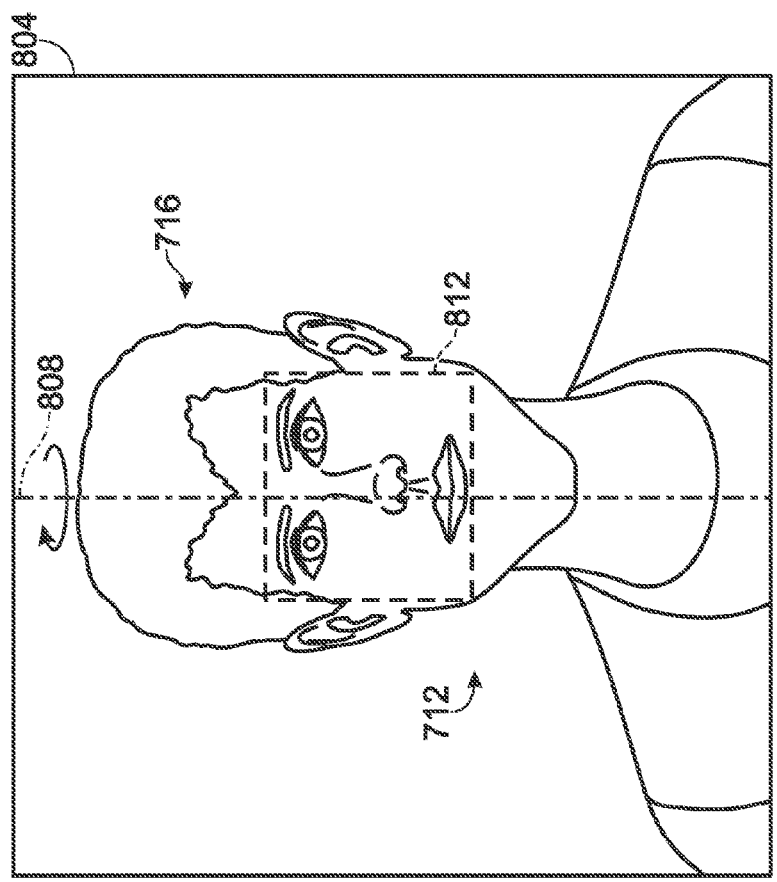
FIG. 6 is a schematic view of a run-time computing device according to an embodiment of the present disclosure.

Turning now to FIG. 6, a schematic illustration of a run-time computing device 600 according to an embodiment of the present disclosure is provided. As explained in more detail below, the run-time computing device 600 may utilize one or more of the first training model 146, second training model 150 and third training model 154 to estimate one or more head rotation angles of a user head. The run-time computing device 600 may include a head rotation angle estimating program 604 that may be stored in mass storage 608 of the run-time computing device.

The run-time computing device 600 may be operatively connected to a display device 624, and may include one or more sensors 628 that receives user image frame data 632. With reference to FIG. 7, in one example the run-time computing device 600 may take the form of a gaming console 700 that is operatively connected to a display device 704 and a sensor in the form of a depth camera 708.

The depth camera 708 may capture depth image data related to distances of features of a user 712 from the camera, including the user head 716 of the user. The depth camera 708 may be separate from the gaming console 700 as shown in FIG. 7, or may be integrated into the gaming console. The user 712 may provide input to the gaming console 700 via the depth camera 708 by performing various movements. Examples of depth cameras include, but are not limited to, time-of-flight cameras, structured light cameras, and stereo camera systems.

The depth camera 708 may also include one or more other sensors for receiving input from the user 712, such as an RGB video camera that captures color image data, a monochrome video camera that captures monochrome image data such as IR image data, one or more microphones, etc. For purposes of this description, the depth camera 708 will be described as also including an RGB video camera for capturing color image data.

Figure 8:
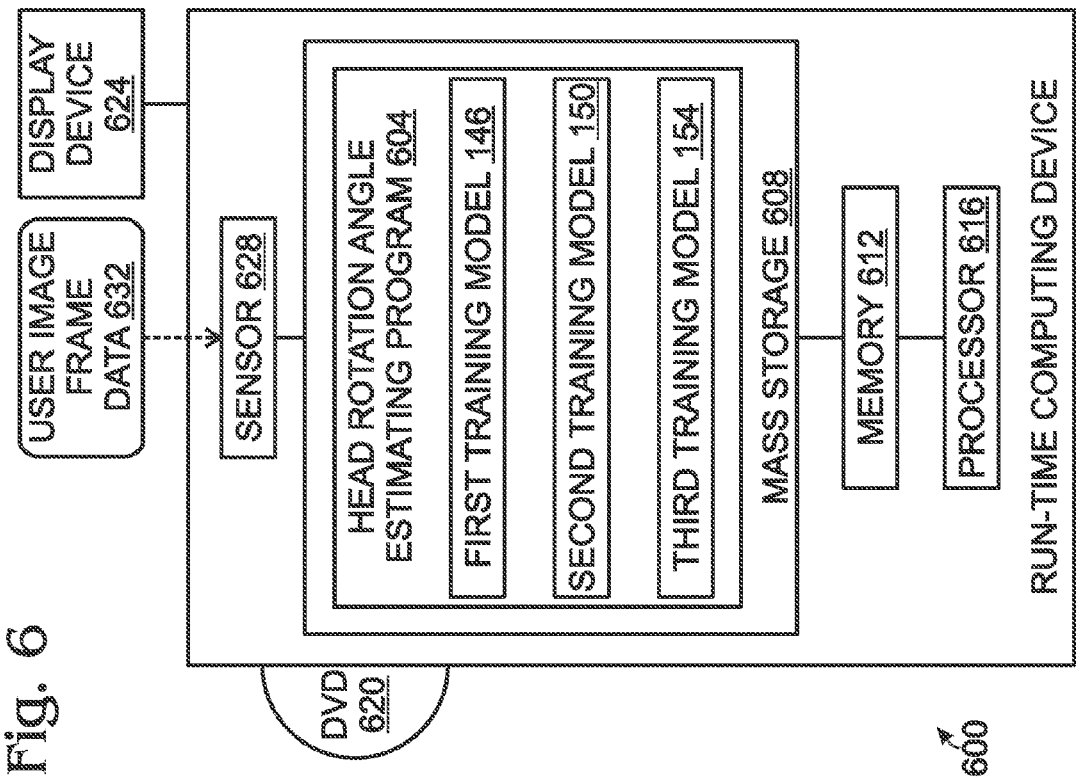
FIG. 8 is a schematic view of a user image frame including a user face image that is captured by the gaming system depth camera of FIG. 7.

With reference now to FIG. 8, the RGB video camera in the depth camera 708 may capture a user image frame 804 that includes the user head 716. As explained in more detail below, the user image frame 804 may be used to estimate one or more head rotation angles of the user head 716 about one or more axes of rotation, such as a yaw axis of rotation 808.

With reference again to FIG. 6, in estimating one or more head rotation angles of the user head 716, the head rotation angle estimating program 604 may utilize the first training model 146, second training model 150, and/or third training model 154 as described above. The head rotation angle estimating program 604 may be loaded into memory 612 and executed by a processor 616 of the run-time computing device 600 to perform one or more of the methods described in more detail below.

In some examples the head rotation angle estimating program 604 may be received by the run-time computing device 600 from removable computer-readable storage media 620, shown here in the form of a DVD. The removable computer-readable storage media 620 may also take the form of CDs, HD-DVDs, Blu-Ray Discs, EEPROMs, and/or floppy disks, among others. In other examples, the head rotation angle estimating program 604 may be received from a remote source via network.

The run-time computing device 600 may take the form of a gaming console 700 as shown in FIG. 7. Other examples of suitable computing run-time computing devices 600 include, but are not limited to, desktop computer, laptop computer, tablet computing, mobile computer, networking computer, home entertainment computer, set-top box (e.g. cable television boxes, satellite television boxes) or any other type of suitable computing device. Additional details regarding the components and computing aspects of the run-time computing device 600 are described in more detail below with respect to FIG. 11.

Turning now to FIGS. 9A, 9B, and 9C, an embodiment of a method 900 for estimating a head rotation angle of a user head will now be described. The method 900 may be performed using the hardware and software components of the run-time computing device 600 described above, or using any other suitable components.

At 902 the method 900 may include capturing a user image frame 804 that includes the user head 716. At 904 the method 900 may include detecting a user face image 812 in the user image frame 804. With reference to FIG. 8, the user face image 812 may comprise, for example, an RGB image that is 40 pixels wide by 40 pixels high. To detect the user face image 812 of the user head 716, the head rotation angle estimating program 604 may use any suitable face detection technologies and/or algorithms including, but not limited to, local binary patterns (LBP), principal component analysis (PCA), independent component analysis (ICA), evolutionary pursuit (EP), Elastic Bunch Graph Matching (EBGM), or other suitable algorithm or combination of algorithms.

At 906 the method 900 may include converting the user face image 812 to a user LBP feature vector based on local binary patterns in the user face image. In one example, the area of the user face image 812 is divided into smaller sub-regions from which LBP histograms are extracted. The histograms are concatenated into a single, spatially enhanced feature histogram that represents the user face image 812.

At 908 the method 900 may include projecting the user LBP feature vector into a first low dimension pose space using the first training model 146 to obtain a first low dimension pose space user vector. With reference to the descriptions above, it will be appreciated that the first low dimension pose space corresponding to the first training model 146 includes a plurality of first pose classes related to rotation angles about a yaw rotation axis, such as yaw rotation axis 808. Additionally, the first training model 146 may comprise applying principal component analysis and linear discriminant analysis to generate the first low dimension pose space user vector.

At 910 the method 900 may include comparing the first low dimension pose space user vector to other vectors in the first low dimension pose space to estimate the head rotation angle of the user head 716 about the yaw rotation axis 808. In one example, at 912 the method 900 includes using k-nearestneighbor regression to compare the first low dimension pose space user vector to other vectors. At 914 the method may include finding the k-nearest-neighbors to the first low dimension pose space user vector in the first low dimension pose space using distances from pre-determined center points of the k nearest pose classes, where k is a positive integer.

In some examples, the value for k may be determined heuristically. In one example where k=20, the head rotation angle estimating program 604 may find the 20 training image samples in the low dimension pose space that are nearest to the first low dimension pose space user vector projected into the low dimension pose space. To find the nearest training image samples, the head rotation angle estimating program 604 may measure the Euclidian distances between the first low dimension pose space user vector and the pre-determined center points of the 20 nearest pose classes. Using these Euclidian distances, at 916 the method 900 may include computing the weighted average of the rotation angle values related to the 20 nearest pose classes, where the weight given to an angle value/pose class is the inverse of the distance to that angle value/pose class.

As noted above, the head rotation angle estimating program may also utilize the second training model 150 and the third training model 154 to estimate a rotation angle of the user head 716 about a pitch axis of rotation and a roll axis of rotation, respectively. It will be appreciated that the pitch and roll axes of rotation of the user head 716 are oriented with respect to the yaw axis 808 and one another in the same manner as the yaw 308, pitch 312, and roll 316 axes of rotation illustrated in FIG. 3.

At 918, the method 900 may include projecting the user LBP feature vector into a second low dimension pose space using the second training model 150 to obtain a second low dimension pose space user vector. It will be appreciated that the second low dimension pose space corresponding to the second training model 150 includes a plurality of second pose classes related to rotation angles about a pitch rotation axis. Additionally, the second training model 150 comprises applying principal component analysis and linear discriminant analysis to generate the second low dimension pose space user vector.

At 920 the method 900 may include comparing the second low dimension pose space user vector to other vectors in the second low dimension pose space to estimate the head rotation angle of the user head 716 about the pitch rotation axis. As noted above, k-nearest-neighbor regression may be used to compare the second low dimension pose space user vector to other vectors.

At 922, the method 900 may include projecting the user LBP feature vector into a third low dimension pose space using the third training model 154 to obtain a third low dimension pose space user vector. It will be appreciated that the third low dimension pose space corresponding to the third training model 154 includes a plurality of third pose classes related to rotation angles about a roll rotation axis. Additionally, the third training model 154 comprises applying principal component analysis and linear discriminant analysis to generate the third low dimension pose space user vector.

At 924 the method 900 may include comparing the third low dimension pose space user vector to other vectors in the third low dimension pose space to estimate the head rotation angle of the user head 716 about the roll rotation axis. As noted above, k-nearest-neighbor regression may be used to compare the third low dimension pose space user vector to other vectors.

It will also be appreciated that detecting specific user inputs or gestures may be useful in many computer interaction contexts and applications, such as interactive video games, educational applications, etc. For example, such user inputs may be used to determine a user intent to interact with the computing system, to control one or more aspects of a video game, etc.

In another example, an application or game may involve asking a yes-or-no question and receiving an answer from the user. In this context, at 926 the method 900 may also include capturing a plurality of user image frames that each includes a user head. At 928 the method may include, for each user image frame, estimating the user head rotation angle about the pitch axis of rotation and the yaw axis of rotation, as described above. At 930 the method 900 may analyze the head rotation angles of the plurality of user image frames about the pitch and yaw axes of rotation to detect either a yes response from the user head or a no response from the user head.

In other examples, authenticating a user of the run-time computing device 600 by comparing a stored user face image with a currently detected user face image may be desirable. In these contexts, it will be appreciated that the stored user face image is captured at a first user head rotation angle, while the currently detected user face image may be captured at the same or different user head angle. To improve the accuracy of user face image comparisons, it may be desirable that the stored user face image and the currently captured user face image have corresponding user head rotation angles.

Accordingly, at 932 the method 900 may also include storing a first user face image of a user head and its corresponding first head rotation angle. At 934 the method 900 may include capturing a second user image frame that may include the user head or the head of a different user. At 936 the method 900 may include detecting a second user face image in the second user image frame. At 938 the method 900 may include estimating a second head rotation angle based on the second user face image. If the second head rotation angle corresponds to the first head rotation angle, then at 940 the method 900 may include authenticating the identity of the second user face image by comparing the second user face image to the first user face image. In this manner, the authentication process is performed by comparing user face images that are captured at corresponding user head rotation angles. It will be appreciated that corresponding user head rotation angles may include angles that match within a predetermined range such as +/−0.1 degrees, +/−0.5 degrees, +/−1.0 degree, +/−5.0 degrees, or other suitable range.

It will be appreciated that methods 200 and 900 described above may be combined to generate one or more low dimension pose spaces and to estimate one or more head rotation angles of a user head using those pose spaces. Method 200 may be performed in a training phase at the training computing device 100. Method 900 may include providing the head rotation angle estimating program 604 that may be executed in a run-time phase at the run-time computing device 600 for estimating the head rotation angle of the user head.

Figure 10:
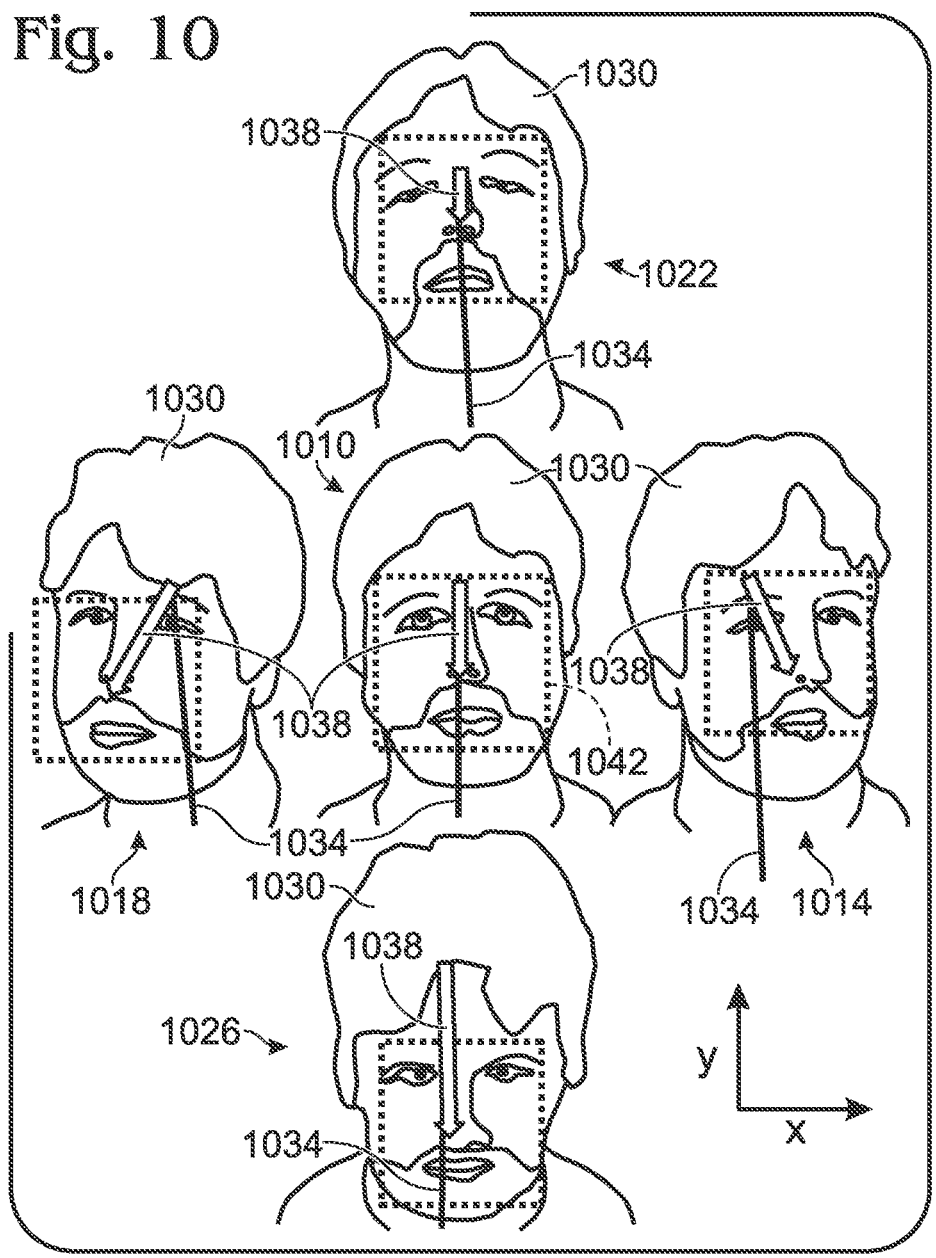
FIG. 10 is a schematic illustration of a user's head in several orientations and a corresponding face center offset vector for each orientation according to another method of estimating a user head rotation angle of the present disclosure.

Turning now to FIG. 10, another method of estimating a user head rotation angle will now be described. FIG. 10 is a schematic illustration of five user image frames 1010, 1014, 1018, 1022 and 1026 that each show a user's head 1030 in a different orientation or angle of rotation. For ease of description, the user image frame 1010 corresponding to a face front orientation will be described in more detail below. It will be appreciated that the following description of user image frame 1010 applies equally to the other four user image frames 1014, 1018, 1022 and 1026.

Turning to user image frame 1010, in one example the user image frame is a color RGB image that may be captured as described above. In other examples, the user image frame may be a monochrome IR image. The position of the user's head 1030 is also tracked in depth space. For example, the position of the user's head 1030 may be obtained from a depth camera employing a skeletal tracking system, a head-only position tracking system, or other suitable position tracking system. The position of the user's head 1030 in depth space may be projected onto the RGB image such that a skeletal head joint 1034 is established that corresponds to a face front position of the user's head. As explained in more detail below, the skeletal head joint 1034 may remain in a fixed position regardless of the orientation or rotation of the user's head 1030.

A face detection algorithm may then be applied to the RGB image to generate a face bounding box 1042 that overlays the image and contains approximately the user's eyes, nose and mouth. The center of the face bounding box 1042 is then mapped into depth space, and a face center offset vector 1038 is computed by the difference between the center of the face bounding box 1042 (the face center) and the position of the skeletal head joint 1034. With reference to the x-y axis in FIG. 10, the x-value of the face center offset vector 1038 is representative of the rotation of the user's head 1030 about a yaw axis of rotation, while the y-value of the face center offset vector 1038 is representative of the rotation of the user's head 1030 about a pitch axis of rotation.

With reference now to user image frames 1014, 1018, 1022 and 1026, it will be appreciated that as the user's head 1030 rotates, the face bounding box 1042 also moves to continue to contain approximately the user's eyes, nose and mouth. It will also be appreciated that the skeletal head joint 1034 remains fixed in position, regardless of the rotation of the user's head 1030. It will also be appreciated that the magnitude and direction of the face center offset vector 1038 varies according to the magnitude and direction of rotation of the user's head 1030.

For a given user, a computing system such as the run-time computing device 600 may determine the values of the face center offset vectors 1038 that correspond to 0, +45 and −45 degrees of rotation about the yaw and pitch axes of rotation. Such values may be determined heuristically, via a calibration process in which the user moves the user's head 1030 about the yaw and pitch axes as the system collects images and corresponding positions of the user's head, or dynamically via machine learning techniques, such as techniques using PCA and LBP as described above, or any other suitable technique. Once the system has determined the values of the face center offset vectors 1038 that correspond to 0, +45 and −45 degrees rotation about the yaw and pitch axes of rotation, for a given user image the system may use linear interpolation to determine angles of rotation of the user's head 1030 about the yaw and pitch axes of rotation.

While the above-described example relates to estimating rotation angles about the yaw and pitch axes of rotation, it will be appreciated that this method may also be used to estimate rotation angles about the roll axis of rotation.

It will be appreciated that the above described systems and methods may be utilized to gather a large amount of training data in the form of training image frames. This training data may be used to train one or more discriminative training models and obtain corresponding low dimension pose spaces in which k-nearest-neighbor computations may be performed efficiently and effectively. In some examples, computation time for estimating a rotation angle for a user image frame using the above-described methods may be about 2 milliseconds.

FIG. 11 schematically illustrates a nonlimiting embodiment of a computing device 1100 that may perform one or more of the above described methods and processes. Computing device 1100 is shown in simplified form. It is to be understood that virtually any computer architecture may be used without departing from the scope of this disclosure. In different embodiments, computing device 1100 may take the form of a desktop computing device, a mobile computing device such as a laptop, notebook or tablet computer, network computer, home entertainment computer, gaming system, etc. Further, in some embodiments the methods and processes described herein may be implemented as a computer application, computer service, computer API, computer library, and/or other computer program product in a computing system that includes one or more computers.

As shown in FIG. 11, computing device 1100 includes a logic subsystem 1110, a data-holding subsystem 1120, a display subsystem 1130, and a communication subsystem 1140. Computing device 1100 may optionally include other subsystems and components not shown in FIG. 11. In addition to head-mounted display devices, computing device 1100 may also optionally include user input devices such as keyboards, mice, game controllers, cameras, microphones, and/or touch screens, for example.

Logic subsystem 1110 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 1110 may include one or more processors that are configured to execute software instructions. Additionally or alternatively, the logic subsystem 1110 may include one or more hardware or firmware logic machines configured to execute hardware or firmware instructions. Processors of the logic subsystem 1110 may be single core or multicore, and the programs executed thereon may be configured for parallel or distributed processing. Processors may optionally include individual components that are distributed throughout two or more devices that may be remotely located and/or configured for coordinated processing. One or more aspects of the processors may be virtualized and executed by remotely accessible networked computing devices configured in a cloud computing configuration.

Data-holding subsystem 1120 may include one or more physical, non-transitory devices configured to hold data and/or instructions executable by the logic subsystem 1110 to implement the methods and processes described herein. When such methods and processes are implemented, the state of data-holding subsystem 1120 may be transformed (e.g., to hold different data).

Data-holding subsystem 1120 may include removable media and/or built-in devices. Data-holding subsystem 1120 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 1120 may include devices with one or more of the following characteristics: volatile, nonvolatile, dynamic, static, read/write, read-only, random access, sequential access, location addressable, file addressable, and content addressable. In some embodiments, logic subsystem 1110 and data-holding subsystem 1120 may be integrated into one or more common devices, such as an application specific integrated circuit or a system on a chip.

FIG. 11 also shows an aspect of the data-holding subsystem 1120 in the form of removable computer-readable storage media 1150, which may be used to store and/or transfer data and/or instructions executable to implement the methods and processes described herein. Removable computer-readable storage media 1150 may take the form of the DVDs 120 and 620 illustrated in FIGS. 1 and 6, respectively, CDs, HD-DVDs, Blu-Ray Discs, EEPROMs, and/or floppy disks, among others.

It is to be appreciated that data-holding subsystem 1120 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

Display subsystem 1130 includes one or more image display systems configured to present a visual representation of data held by data-holding subsystem 1120. As the methods and processes described herein change the data held by the data-holding subsystem 1120, and thus transform the state of the data-holding subsystem, the state of display subsystem 1130 may likewise be transformed to visually represent changes in the underlying data.

Communication subsystem 1140 may be configured to communicatively couple computing device 1100 with one or more networks and/or one or more other computing devices. Communication subsystem 1140 may include wired and/or wireless communication devices compatible with one or more different communication protocols. As nonlimiting examples, communication subsystem 1140 may be configured for communication via a wireless telephone network, a wireless local area network, a wired local area network, a wireless wide area network, a wired wide area network, etc. In some embodiments, communication subsystem 1140 may allow computing device 1100 to send and/or receive messages to and/or from other devices via a network such as the Internet.

The term "program" may be used to describe an aspect of the methods 200 or 900 that is implemented to perform one or more particular functions. In some cases, such a program may be instantiated via logic subsystem 1110 executing instructions held by data-holding subsystem 1120. It is to be understood that different programs may be instantiated from the same application, service, code block, object, library, routine, API, function, etc. Likewise, the same program may be instantiated by different applications, services, code blocks, objects, routines, APIs, functions, etc. The term "program" is meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for generating a low dimension pose space for estimating one or more head rotation angles, comprising:
   capturing a plurality of training image frames that each includes a test subject head under a plurality of conditions;
   for each of the training image frames, recording an actual rotation angle of the test subject head about a rotation axis;
   sampling a portion of the plurality of training image frames to create a training model subset of the training image frames;
   for each of the training image frames in the training model subset:
      detecting a test subject face image in the training image frame;
      converting the test subject face image to a test subject LBP (Local Binary Patterns) feature vector based on local binary patterns; and
      applying principal component analysis to the test subject LBP feature vector to generate a test subject PCA (Principal Component Analysis) feature vector;
   defining a plurality of pose classes related to rotation angles about the rotation axis;
   for each of the test subject PCA feature vectors, grouping the test subject PCA feature vector into one of the plurality of pose classes that corresponds to the actual rotation angle associated with the test subject PCA feature vector; and
   applying linear discriminant analysis to each of the plurality of pose classes to generate the low dimension pose space.

2. The method of claim 1, further comprising projecting the test subject PCA feature vectors into the low dimension pose space.

3. The method of claim 1, wherein the plurality of training image frames includes one or more of color image data, monochrome image data, and depth image data.

4. The method of claim 1, wherein capturing a plurality of training image frames of a test subject head under a plurality of conditions further comprises capturing a plurality of training image frames of test subject heads of at least approximately 200 test subjects under a plurality of conditions.

5. The method of claim 1, wherein the plurality of conditions includes one or more of a lighting condition, a distance from a camera, and a test subject expression.

6. The method of claim 5, wherein the lighting condition includes at least a bright lighting condition and a dark lighting condition that is darker than the bright lighting condition, the distance from the camera includes at least a near distance from the camera and a far distance from the camera that is larger than the near distance, and the test subject expression includes at least a neutral mouth expression, a mouth open expression, and a smiling expression.

7. The method of claim 1, wherein recording an actual rotation angle of the test subject head about a rotation axis further comprises recording an actual rotation angle of the test subject head about each of a yaw, pitch and roll axis.

8. The method of claim 1, wherein each pose class of the plurality of pose classes represents a range of head rotation angles.

9. The method of claim 1, wherein recording an actual rotation angle of the test subject head about a rotation axis further comprises receiving data from a motion sensor associated with the test subject head.

10. The method of claim 1, further comprising, for each pose class of the plurality of pose classes:
determining a pose class center point; and
discarding all points from the pose class except for the pose class center point.

11. A method for estimating a head rotation angle of a user head, comprising:
capturing a user image frame that includes the user head;
detecting a user face image in the user image frame;
converting the user face image to a user LBP (Local Binary Patterns) feature vector based on local binary patterns;
projecting the user LBP feature vector into a low dimension pose space using a training model to obtain a low dimension pose space user vector, wherein the training model comprises applying principal component analysis and linear discriminant analysis to generate the low dimension pose space user vector, and wherein the low dimension pose space includes a plurality of pose classes related to rotation angles about a rotation axis, the pose classes obtained using the training model; and
comparing the low dimension pose space user vector to other vectors in the low dimension pose space to estimate the head rotation angle of the user head about the rotation axis.

12. The method of claim 11, wherein comparing the low dimension pose space user vector to other vectors in the low dimension pose space further comprises using a k-nearest-neighbor regression.

13. The method of claim 12, further comprising finding k nearest neighbors to the low dimension pose space user vector in the low dimension pose space using distances from predetermined center points of k nearest pose classes, wherein k is a positive integer.

14. The method of claim 13, wherein using a k-nearest-neighbor regression further comprises computing a weighted average of rotation angles related to the k nearest pose classes.

15. The method of claim 11, wherein the low dimension pose space is a first low dimension pose space, the rotation axis is a first rotation axis, the training model is a first training model, the low dimension pose space user vector is a first low dimension pose space user vector, and the pose classes are first pose classes and further comprising:
projecting the user LBP feature vector into a second low dimension pose space that corresponds to a second rotation axis using a second training model to obtain a second low dimension pose space user vector, wherein the second training model comprises applying principal component analysis and linear discriminant analysis to generate the second low dimension pose space user vector, and wherein the second low dimension pose space includes a plurality of second pose classes related to rotation angles about the second rotation axis, the second pose classes obtained using the second training model; and
comparing the second low dimension pose space user vector to other vectors in the second low dimension pose space to estimate the head rotation angle of the user head about the second rotation axis.

16. The method of claim 15, further comprising:
projecting the user LBP feature vector into a third low dimension pose space that corresponds to a third rotation axis using a third training model to obtain a third low dimension pose space user vector, wherein the third training model comprises applying principal component analysis and linear discriminant analysis to generate the third low dimension pose space user vector, and wherein the third low dimension pose space includes a plurality of third pose classes related to rotation angles about the third rotation axis, the third pose classes obtained using the third training model; and
comparing the third low dimension pose space user vector to other vectors in the third low dimension pose space to estimate the head rotation angle about the third rotation axis of the user head.

17. The method of claim 11, wherein the rotation axis is a pitch rotation axis, further comprising:
capturing a plurality of user image frames that each includes the user head;
for each of the plurality of user image frames, estimating the head rotation angle of the user head about the pitch rotation axis and about a yaw rotation axis; and
analyzing the head rotation angles of the plurality of user image frames to detect either a yes response from the user head or a no response from the user head.

18. The method of claim 11, wherein the user image frame is a first user image frame, the user face image is a first user face image, and the head rotation angle is a first head rotation angle, further comprising:
storing the first user face image and the first head rotation angle of the user head;
capturing a second user image frame;
detecting a second user face image in the second user image frame;
estimating a second head rotation angle based on the second user face image; and
if the second head rotation angle corresponds to the first head rotation angle, then authenticating an identity of the second user face image by comparing the second user face image to the first user face image.

19. A method for generating a low dimension pose space and estimating a head rotation angle of a user head, comprising:
in a training phase at a training computing device:
capturing a plurality of training image frames that each includes a test subject head under a plurality of conditions;
for each of the training image frames, recording an actual rotation angle of the test subject head about a rotation axis;
sampling a portion of the plurality of training image frames to create a training model subset of the training image frames;
for each of the training image frames in the training model subset:
detecting a test subject face image in the training image frame;
converting the test subject face image to a test subject LBP (Local Binary Patterns feature vector based on local binary patterns; and
applying principal component analysis to the test subject LBP feature vector to generate a test subject PCA (Principal Component Analysis) feature vector;
defining a plurality of pose classes related to rotation angles about the rotation axis;
for each of the test subject PCA feature vectors, grouping the test subject PCA feature vector into one of the plurality of pose classes that corresponds to the actual rotation angle associated with the test subject PCA feature vector; and
applying linear discriminant analysis to each of the plurality of pose classes to generate the low dimension pose space;
providing a program to be executed in a run-time phase at a run-time computing device for estimating the head rotation angle of the user head, the program causing the run-time computing device to perform the steps of:

capturing a user image frame that includes the user head;

detecting a user face image in the user image frame;

converting the user face image to a user LBP feature vector based on local binary patterns;

projecting the user LBP feature vector into the low dimension pose space to obtain a low dimension pose space user vector; and comparing the low dimension pose space user vector to other vectors in the low dimension pose space to estimate the head rotation angle of the user head about the rotation axis.

20. The method of claim 19, wherein the low dimension pose space is a first low dimension pose space, the rotation axis is a first rotation axis, and the low dimension pose space user vector is a first low dimension pose space user vector, and wherein the program causes the run-time computing device to perform the additional steps of:

projecting the user LBP feature vector into a second low dimension pose space that corresponds to a second rotation axis to obtain a second low dimension pose space user vector; and comparing the second low dimension pose space user vector to other vectors in the second low dimension pose space to estimate the head rotation angle of the user head about the second rotation axis.

* * * * *